United States Patent
Katano et al.

(10) Patent No.: US 7,903,391 B2
(45) Date of Patent: Mar. 8, 2011

(54) ALUMINUM ELECTRODE PLATE FOR ELECTROLYTIC CAPACITOR

(75) Inventors: Masahiko Katano, Shizuoka (JP); Masashi Isobe, Shizuoka (JP); Yuya Yoshida, Shizuoka (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 322 days.

(21) Appl. No.: 12/304,788

(22) PCT Filed: Aug. 24, 2007

(86) PCT No.: PCT/JP2007/000901
§ 371 (c)(1),
(2), (4) Date: Dec. 15, 2008

(87) PCT Pub. No.: WO2008/035454
PCT Pub. Date: Mar. 27, 2008

(65) Prior Publication Data
US 2009/0303661 A1  Dec. 10, 2009

(30) Foreign Application Priority Data
Sep. 20, 2006 (JP) ................................ 2006-254920

(51) Int. Cl.
*H01G 9/04* (2006.01)
(52) U.S. Cl. ......... 361/508; 361/509; 361/512; 361/523; 361/525; 361/528
(58) Field of Classification Search .................. 361/508, 361/503–504, 509, 516–519, 523–525, 528–529, 361/530, 511–512; 29/25.01, 25.03
See application file for complete search history.

(56) References Cited

U.S. PATENT DOCUMENTS

| 5,439,565 A | * | 8/1995 | Torii et al. ............... 205/674 |
| 6,038,124 A | * | 3/2000 | Uchi et al. ............... 361/509 |
| 6,611,422 B2 | * | 8/2003 | Yamazaki et al. ......... 361/508 |
| 6,620,306 B2 | * | 9/2003 | Yoshimura et al. ....... 205/640 |
| 6,781,817 B2 | * | 8/2004 | Andelman ................. 361/503 |
| 6,876,541 B1 | * | 4/2005 | Kato et al. ................. 361/523 |
| 7,057,881 B2 | * | 6/2006 | Chow et al. ............... 361/508 |

FOREIGN PATENT DOCUMENTS

| JP | 9-071832 A | 3/1997 |
| JP | 2004-319795 A | 11/2004 |
| JP | 2005-264288 A | 9/2005 |

OTHER PUBLICATIONS

Form PCT/ISA/210 (International Search Report) dated Nov. 20, 2007.

* cited by examiner

*Primary Examiner* — Nguyen T Ha
(74) *Attorney, Agent, or Firm* — Buchanan Ingersoll & Rooney PC

(57) ABSTRACT

This invention provides an aluminum electrode plate for an electrolytic capacitor, which, even when the thickness of an etching layer is large, can realize a high level of impregnation of a solid electrolyte and can reduce ESR of a capacitor. An aluminum plate having an aluminum purity of not less than 99.98% by mass is etched to form an etching layer having a depth of 70 μm or above. When a plane cross section of a position deeper than 20 μm from the surface in the etching layer is measured with an image analyzer, for each measured face, not less than 70% of the total number of pits within the measured face is accounted for by pits having a diameter of 0.01 to 1 μm φ; in terms of equivalent circle diameter. The aluminum plate has an aluminum purity of not less than 99.98% by mass and comprises 5 to 50 ppm of Fe and 5 to 40 ppm of Cu with the balance consisting of inevitable impurities. The aluminum plate further contains $1 \times 10^7$ to $10^{10}/cm^3$ iron-containing intermetallic compound having a particle diameter of 0.1 to 1.0 μm φ in terms of spheres.

2 Claims, No Drawings

ALUMINUM ELECTRODE PLATE FOR ELECTROLYTIC CAPACITOR

TECHNICAL FIELD

The present invention relates to an aluminum electrode plate made by etching an aluminum plate and is used for an electrolytic capacitor. In the present specification, "aluminum electrode plate" means to include thin aluminum electrode plates having a thickness of 200 μm or less, as well.

BACKGROUND ART

When anode conductors of chip type electrolytic capacitors are manufactured, an aluminum plate is electrochemically etched, and an aluminum electrode plate comprising an etching layer having pits formed in a variety of configurations is obtained. A dielectric film is then provided to the resulting pit surface, and the pits are filled with a solid electrolyte. A cathode conductive layer is then further provided to the solid electrolyte layer. During use, a voltage is applied to an electrolytic capacitor that has been configured in this manner.

In case the electrolytic capacitor has a large electric resistance; i.e. equivalent series resistance (ESR), a large amount of heat is generated during use. Not only does electrical current tend to be lost, but the design must incorporate auxiliary equipment in order to cause the resulting heat to dissipate. Electrolytic capacitors having a low ESR have accordingly been in demand.

In patent document 1, a proposal is made for obtaining an aluminum electrode plate for an electrolytic capacitor having a 220-μm-thick etching layer on one side. An aluminum plate having a thickness of 450 μm is used as a starting material and is etched under the following conditions described in paragraph (0041): " . . . a solution of 2% aluminum chloride and 8% hydrochloric acid is used as the etching solution, and a treatment is performed wherein electricity is provided at a solution temperature of 30° C., a frequency of 50 Hz, and a current of 0.15 A until an etching layer of the desired thickness is formed." (refer to patent document 1).

[Patent Document 1] Japanese Laid-open Patent No. 2004-319795.

SUMMARY OF INVENTION

Technical Problem

Using a novel solid electrolyte layer lowers the ESR when using the aluminum electrode plate for an electrolytic capacitor disclosed in the abovementioned patent document 1. This novel solid electrolyte layer is formed by the following method, as mentioned in paragraphs (0043) and (0044) of patent document 1. A dielectric film is provided to the pitted surface, whereupon an ethanol solution of pyrrole monomer is added dropwise into the pits. An aqueous solution of ammonium persulfate and 2-sodium naphthalenesulfonate is further added dropwise into the pits, chemical polymerization is brought about, and a precoat layer comprising polypyrrole is formed. The electrode plate is then immersed in an acetonitrile electrolyte containing pyrrole monomer and 2-sodium naphthalenesulfonate, a stainless-steel wire is brought into contact with a part of the previously formed chemically polymerized polypyrrole layer, and an anode is formed. Additionally, electropolymerization is performed using a stainless steel plate as a cathode, and an electropolymerized polypyrrole is formed.

However, a problem is presented when an aluminum electrode plate for an electrolytic capacitor is manufactured by the method described in patent document 1. The pits have too small a configuration, and cannot be adequately impregnated by the solid electrolyte. Large pits are also present, and unevenness results for this and other reasons; therefore, the ESR inevitably increases in electrolytic capacitor applications.

With the foregoing problems in view, it is an object of the present invention to provide an aluminum electrode plate for an electrolytic capacitor that is highly capable of being impregnated by solid electrolyte even when the etching layer is thick, and is able to reduce the ESR when used in an electrolytic capacitor.

Solution to Problem

The inventors perfected the present invention upon making the following discovery. When a primary alternating current etching process is performed using a low concentration aqueous solution of hydrochloric acid, and a main alternating current etching process is subsequently performed using a high concentration, low temperature aqueous solution of hydrochloric acid, an etching layer is produced in the form of a sponge with a potentially high ratio of pits of a specific size, even if the etching layer is thick, and an electrolytic capacitor with a low ESR is obtained.

In the present invention, specifically, an aluminum electrode plate made by etching an aluminum plate and used for an electrolytic capacitor is characterized in that: the purity of the aluminum is 99.98 mass % or higher; at least one side comprises an etching layer at 70 μm or more from the surface in the depth direction; and when an image analyzing apparatus is used to measure a planar section of the etching layer in a position deeper than 20 μm from the surface, the number of pits in each measurement plane having a circle equivalent diameter of 0.01 to 1 μm is 70% or more of all of the pits within the corresponding measurement plane. An electrolytic capacitor having a low ESR can accordingly be obtained even when a conventional solid electrolyte is used.

In the present invention, the aluminum electrode plate for an electrolytic capacitor preferably contains: aluminum having a purity of 99.98 mass % or higher, Fe in an amount of 5 to 50 ppm, Cu in an amount of 5 to 40 ppm, and the remainder comprising unavoidable impurities; and the quantity of Fe-containing intermetallic compounds having a spherical equivalent particle diameter of 0.1 to 1.0 μm is $1\times10^7$ to $10^{10}/cm^3$.

When such a configuration is employed, the diameter and quantity of the pits resulting from the electrolytic etching can be kept within more preferable ranges, and an electrolytic capacitor with an even lower ESR can be obtained.

BEST MODE FOR CARRYING OUT THE INVENTION

A configuration and manufacturing method relating to the aluminum electrode plate for an electrolytic capacitor of the present invention is described hereunder as an embodiment thereof. The embodiment described below relates to a case where alternating-current etching is employed. The present invention is not limited to such a manufacturing method.

The aluminum electrode plate for an electrolytic capacitor according to the present embodiment is obtained by etching an aluminum plate having an aluminum purity of 99.98 mass % or higher. Using an aluminum plate of such purity results in greater toughness and greater ease of handling when the electrolytic capacitor is manufactured. It is undesirable for the degree of purity of the aluminum to be below the lower limit, since a concern will arise that the hardness will increase, toughness will decrease, and cracking or other damage will occur during handling.

The thickness of the aluminum plate supplied to the etching process may be varied depending on the object. For example, an aluminum plate having a thickness of from 150 μm to 1 mm is subjected to alternating-current etching using a low concentration aqueous solution of hydrochloric acid as the primary electrolytic treatment. The aluminum plate is preferably subjected to defatting, washing, and light etching as a pre-treatment, whereby a surface oxide film is removed.

The low concentration aqueous solution of hydrochloric acid that is used as the electrolyte in the primary electrolytic treatment has a content ratio of 1.5 to 2.5 mol/L of hydrochloric acid and 0.05 to 0.5 mol/L of sulfuric acid. Etching is performed, and multiple pits are formed in the surface of the aluminum plate at a solution temperature of 40 to 55° C.; frequency of 10 to 25 Hz; an alternating-current waveform that is sinusoidal, rectangular, superposed AC-DC, or another configuration; a current density of 40 to 50 A/dm$^2$; and a treatment time of 30 to 60 sec.

The main electrolytic treatment is performed after the primary electrolytic treatment has been performed, pits are formed to yield a sponge-like state, and etching is performed. The electrolyte used in the main electrolytic treatment is an aqueous solution having a content ratio of 4 to 6 mol/L of hydrochloric acid and 0.05 to 0.5 mol/L of sulfuric acid. The pits formed using the primary electrolytic treatment are again formed in the electrolyte under a solution temperature that is 20 to 35° C. lower than that employed in the primary processing; a frequency of 30 to 60 Hz; an alternating-current waveform that is sinusoidal, rectangular, superposed AC-DC, or another configuration; a current density that is 20 to 35 A/dm$^2$ lower than that employed in the primary processing; and a processing time set to a time allowing a prescribed etching layer thickness to be reached. Using this method minimizes dissolving that does not contribute to the forming of pits on the surface of the aluminum plate, and allows the forming of a deep sponge-like etching layer formed with numerous pits having a diameter of a specific size.

In order to ensure reliable progress from the primary electrolytic treatment to the main electrolytic treatment, a superposed AC-DC waveform may be used before the main electrolytic process is performed, the pitted surface formed by the primary electrolytic treatment may be activated, and then the transition may be made to the main electrolytic treatment. In such a process, etching is performed in about 60 seconds at a duty ratio of approximately 0.07 to 0.09, and a current density of 12 to 17 A/dm$^2$. Using this method of electrolyte etching enables pits to be formed in a sponge-like etching layer that has a thickness of 70 μm or more.

The pit quantity and diameter can be measured using an image analysis apparatus. Specifically, the etched surface is ground in the depth direction over prescribed intervals, and the pit quantity and diameter in the ground surfaces are measured using the image analysis apparatus. Performing a calculation of the ratio of pits having a diameter of 0.01 to 1 μm enables the ratio of pits having a diameter of a specific size in the layers to be measured. The present invention makes it possible to determine that numerous pits of a specific diameter have been formed evenly in the etching layer. Specifically, it is possible to obtain, for the first time, an aluminum electrode plate for an electrolytic capacitor wherein at least one side comprises an etching layer 70 μm or more from the surface in the depth direction, and the number of pits having a diameter of 0.01 to 1 μm as measured using an image analysis apparatus in a planar cross-section is 70% or more, and preferably 75% or more, of the total number of pits on each plane. Using such an aluminum electrode plate for an electrolytic capacitor allows an electrolyte capacitor having a low ESR to be produced. Pits of less than 0.001 μm in diameter do not contribute to an improvement in electrostatic capacity; therefore, the diameters measured by the image analysis apparatus are in the range of 0.001 μm and higher.

The etching layer is preferably formed on at least one side, and preferably both side, to a thickness of 70 μm or more in the depth direction from the surface. In the case that the etching layer is less than 70 μm thick, it will be necessary to increase the number of layers to take the electrostatic capacity into account, and miniaturization of the electrolyte capacitor cannot be expected.

The electrostatic capacity will decrease if numerous pits have a diameter exceeding 1 μm. The diameter is preferably 0.1 μm or less. An electrolyte capacitor having a low ESR can be manufactured by having the number of pits of this size constitute 70% or more, and preferably 75% or more, of the number of all the pits on each side. The number of pits is more preferably 80% or more.

The position in which the pits of specific size are to be measured is deeper than 20 μm from the surface. This is because dissolving that does not contribute to enlargement of the surface area occurs near the surface at the time of electrolytic etching, pits become interconnected, and the pit diameter needlessly increases. Also, the boundary surface between the etching layer and the core portion is irregular and indefinite; therefore, the measurement position is 10 μm toward the surface from the position where the etching depth has been determined (boundary between the etching layer and the core portion).

The electrolyte used for the solid electrolyte is not particularly limited; for example, polythiophene and other well-known solid electrolytes may be used. Solid electrolytes that are caused to react within the pits and that yield a dramatic effect are also acceptable.

The aluminum electrode plate for an electrolytic capacitor according to the present invention comprises aluminum having a purity of 99.98 mass % or higher, and, when [the aluminum electrode plate] (*1) has $1\times10^7$ to $10^{10}$/cm$^3$ Fe-containing intermetallic compounds whose spherical equivalent particle diameter is 0.1 to 1.0 μm, the plate can have a high ratio of pits whose diameter is of the aforementioned specific size, and, moreover, a capacitor with lower ESR can be manufactured. The presumed reasoning is that the particle diameters are small where a large proportion of intermetallic chemical compounds is present; therefore, a chemical conversion film is formed to a uniform thickness on the pit surface, and impregnation by the solid electrolyte is facilitated.

There is no limit to the amount of elements other than aluminum that are present in the aluminum plate comprising aluminum having a purity of 99.98 mass % or higher. However, it is preferable for the composition to be, for example, 50 ppm or less, and preferably 40 ppm or less, of Fe; 40 ppm or less of Cu; and 60 ppm or less of Si, and preferably 40 ppm or less. The reasoning is that when the amounts of Fe and Si exceed the upper limit, crystals and deposits of large intermetallic compounds containing Fe and Si are generated, and the leak current increases. Si itself is also generated, which is undesirable for the same reason. When the amount of Cu exceeds the upper limit, the corrosion potential of the matrix increases and shifts to the electropositive side. A concern therefore arises that etching will be impossible to perform in a desirable manner.

Fe is preferably present in an amount of 5 to 50 ppm because $Al_mFe$, $Al_6Fe$, $Al_3Fe$, Al—Fe—Si, Al—(Fe,M)-Si (where M is another metal) and other intermetallic compounds are generated, and readily become pit starting points in alternating-current etching. Cu is preferably present in an amount of 5 to 40 ppm because the corrosion potential of the matrix can be stabilized due to the presence of the Fe, and pits of a specific size can be readily formed. Ni, Ti, and Zr may be used as other elements in individual amounts of 10 ppm or less, and preferably 3 ppm or less. The other impurities are preferably present in an amount of 3 ppm or less. As a result, pits of a specific size can be readily produced in the form of a sponge, likely because the impurities serve as pit starting points using the above alternating-current etching method.

This type of high-purity aluminum is manufactured by refining an electrolytic primary base metal. Three-layer electrolysis and crystal fractionation are widely employed as the associated refining method, whereby most of the elements other than the aluminum are removed. However, the Fe and Cu can be used as trace alloying elements rather than impurities; therefore, measurements are made of the amounts in which these elements are present after refinement, and if the Fe and Cu content is less than a prescribed amount, mother alloys of Al—Cu, Al—Fe, and the like are added to the melt when slab casting is performed, thereby adjusting Fe or Cu content.

There follows an example of a method for obtaining an aluminum plate having $1 \times 10^7$ to $10^{10}/cm^3$ Fe-containing intermetallic compounds having a spherical equivalent particle diameter of 0.1 to 1.0 µm. An aluminum melt having an aluminum purity of 99.98 mass % or higher and an adjusted Fe content is semi-continuously cast and a slab is obtained. A homogenization treatment is then performed at a temperature of 530° C. or higher. A hot-rolled plate that has been kept for 30 min or longer and 60 min or less, or that has been subjected to three or more passes, with the plate temperature region corresponding to a range in which the Fe-containing intermetallic compounds readily precipitate (300 to 400° C.), is fashioned to a prescribed thickness using only cold rolling, and supplied for etching. In particular, if the aluminum melt of the above composition is cast and rolled in the above manner, Fe-containing intermetallic compounds can be readily obtained in the prescribed quantity and at the preferred size. The number and size of the Fe-containing intermetallic compounds can be measured using an image analyzing apparatus.

In Fe-containing intermetallic compounds having a spherical equivalent particle diameter of less than 0.1 µm, etching pit nuclei will not be readily formed using widely known methods. If the diameter exceeds 1.0 µm, the leak current will be more readily affected when a capacitor is assembled. When there are fewer than $1 \times 10^7/cm^3$ Fe-containing intermetallic compounds having a spherical equivalent particle diameter of 0.1 to 1.0 µm, the ratio of pits having a specific size will be low, whereas if the number exceeds $1 \times 10^{10}/cm^3$, excess dissolving occurs more often.

Working Example 1

An aluminum electrode plate for an electrolytic capacitor was obtained using a 0.3 mm-thick commercial aluminum plate having a purity of 99.98 mass % or higher, both sides of which were etched under the conditions described below. The pit diameter and ratio were then measured using an image analysis apparatus. The measurements were performed in the following manner. The distance between a plane 20 µm from the surface of the sample in the etching depth direction, and a position 10 µm toward the surface from a position at which the etching depth was determined (boundary between the etching layer and the core portion) was divided into four equal parts Grinding was performed sequentially from the surface at the positions corresponding to the resulting five planes, and the surfaces were measured using an image analysis apparatus. The pit diameter and ratio were determined using an average of 10 points on each measurement surface as the measurement value. Table 1 shows the smallest of the values obtained among the measurement results of the five planes in regard to the ratio of the number of pits having a circle equivalent diameter of 0.01 to 1 µm to the number of all pits in the corresponding measurement plane.

The aluminum electrode plate for an electrolytic capacitor was then subjected to a 5 V chemical conversion treatment in an aqueous solution of ammonium adipate, subsequently impregnated with polypyrrole in the conventional manner, yielding a 2.5 V/330 µF capacitor. Measurements were performed of the ESR (100 kHz), electrostatic capacity, and leak current. The results are indicated in Table 1.

(Etching Conditions)

Light etching was performed using an aqueous solution of 10% sodium hydroxide. After the grease and surface oxides had been removed, primary etching was performed in an aqueous solution containing 2 mol/L of hydrochloric acid and 0.02 mol/L of sulfuric acid as the electrolyte. The solution temperature was 50° C., the frequency was 20 Hz, sinusoidal wave alternating current was used, the current density was 45 A/dm$^2$, and the treatment time was 45 seconds. Numerous pits were formed on the surface of the aluminum plate. The main etching treatment was subsequently performed in an aqueous solution containing 6 mol/L of hydrochloric acid and 0.05 mol/L of sulfuric acid as an electrolytic aqueous solution. The solution temperature was 30° C., the frequency was 50 Hz, sinusoidal wave alternating current was used, the current density was 25 A/dm$^2$, and the treatment time was varied. The pits formed in the primary treatment were further formed, surface dissolving was reduced, resulting in etching layers of various thicknesses having the form of a sponge, and comprising numerous pits with small diameters.

TABLE 1

| Sample Number | Ratio of pits having diam. of 0.01-1 µm to all pits in surface (minimum value) | Thickness of etching layer on one side (µm) | ESR (mΩ) | Electrostatic capacity (µF) | Leak current µA/cm$^2$ | Notes |
| --- | --- | --- | --- | --- | --- | --- |
| 1 | 75 | 100 | 2.3 | 336 | 0.1 | Example of the present invention |

As shown in Table 1, according to the present invention, it is possible to obtain an aluminum electrode plate for an electrolytic capacitor having a thick etching layer, as well as an electrolytic capacitor having a low ESR, high electrostatic capacity, and low leak current.

Working Example 2

An aluminum melt was semi-continuously cast, whereupon a 560-mm-thick slab was obtained. The slab was heated at 550° C. for ten hours and evenly treated. The slab was kept at 350° C. in a hot-rolling step for different lengths of time, and then subjected to hot rolling and normal rolling, whereupon a 0.3-mm-thick aluminum plate was obtained. The size and quantity of Fe-containing intermetallic compounds were measured using an image analysis apparatus. The composition is shown in Table 2. Both sides were then etched under the same conditions employed in Working Example 1. A capacitor was assembled in the same way, and the ESR and other characteristics were measured. The results of the measurements are shown in Table 3. "Mass ppm" is the unit used for the chemical compositions shown in Table 2.

TABLE 2

| Alloy symbol | Fe | Si | Cu | Al purity: 99.98 mass percent or above; remainder: unavoidable impurities |
|---|---|---|---|---|
| A | 2 | 20 | 2 | Al purity: 99.98 mass percent or above; remainder: unavoidable impurities |
| B | 10 | 20 | 5 | Al purity: 99.98 mass percent or above; remainder: unavoidable impurities |
| C | 25 | 20 | 20 | Al purity: 99.98 mass percent or above; remainder: unavoidable impurities |
| D | 35 | 20 | 30 | Al purity: 99.98 mass percent or above; remainder: unavoidable impurities |
| E | 40 | 20 | 35 | Al purity: 99.98 mass percent or above; remainder: unavoidable impurities |
| F | 60 | 20 | 50 | Al purity: 99.98 mass percent or above; remainder: unavoidable impurities |

As shown in Table 3, using the aluminum plate according to the present invention, in which the size and quantity of the Fe-containing intermetallic compounds satisfy the prescribed conditions, allows an aluminum electrode plate for an electrolytic capacitor having a thick etching layer to be obtained, as well as an electrolytic capacitor having a low ESR, high electrostatic capacity, and low leak current.

Comparative Example 1

The commercial aluminum plate was the same kind as that used in Working Example 1, which had a purity of 99.98 mass % percent or higher and a thickness of 0.3 mm. Etching was performed on both sides under the following conditions, and measurements were performed using the same method as employed in Working Example 1.

(Etching Conditions)

A solution of 2% aluminum chloride and 8% hydrochloric acid was used, and electricity was supplied until an etching layer of the desired thickness was formed. The treatment was performed at a solution temperature of 30° C., a frequency of 50 Hz, and a current of 0.15 A. The same method used in Working Example 1 was followed to perform chemical conversion, solid electrolyte impregnation was performed, and an electrolytic capacitor was assembled. Deep etching was not performed during assembly; therefore, five sheets were laminated to form an electrolytic capacitor, and measurements were performed. The pit diameters were measured 10 µm and 15 µm from the surface, with the higher result being recorded. The results are shown in Table 4.

TABLE 3

| Sample number | Alloy symbol | Ratio of pits having diam. of 0.01-1 µm to all pits in surface (minimum value) | Thickness of etching layer on one side (µm) | Quantity of Fe-containing intermetallic compounds having diam. of 0.1-1.0 µm (per cm$^3$) | ESR (mΩ) | Electro-static capacity (µF) | Leak current µA/cm$^2$ | Notes |
|---|---|---|---|---|---|---|---|---|
| 2 | a | 75 | 100 | $1 \times 10^5$ | 2.3 | 336 | 0.1 | Example of the present invention |
| 3 | b | 80 | 100 | $1 \times 10^7$ | 2.1 | 340 | 0.1 | Example of the present invention |
| 4 | c | 85 | 100 | $1 \times 10^8$ | 1.7 | 350 | 0.1 | Example of the present invention |
| 5 | d | 80 | 100 | $1 \times 10^9$ | 1.9 | 340 | 0.1 | Example of the present invention |
| 6 | e | 80 | 100 | $1 \times 10^{10}$ | 2.0 | 340 | 0.1 | Example of the present invention |
| 7 | f | 75 | 100 | $1 \times 10^{11}$ | 2.1 | 336 | 0.2 | Example of the present invention |

TABLE 4

| Sample Number | Ratio of pits having diam. of 0.01-1 μm to all pits in surface (minimum value) | Thickness of etching layer on one side μm | ESR mΩ | Electro-static capacity μF | Leak current μA/cm² | Notes |
|---|---|---|---|---|---|---|
| 8 | 50 | 20 | 9.1 | 298 | 15 | Comparative example |

As shown in Table 4, etching was performed over a long time in Comparative Example 1, and the pit diameters only increased even with deep etching. It was accordingly impossible to obtain anything other than an aluminum electrode plate for an electrolytic capacitor with a thin etching layer. The resulting electrolytic capacitor was determined to have a high leak current, a low electrostatic capacity, and a high ESR at 2.5 V/330 Mf.

INDUSTRIAL APPLICABILITY

In the present invention, the etching layer is thick and the pit diameters are optimized. Excellent solid electrolyte impregnation is accordingly obtained. When the capacitor is assembled, the ESR is low, the electrostatic capacity is high, and little leak current is obtained. An electrolytic capacitor with a higher capacity, smaller size, and other improvements can accordingly be obtained.

The invention claimed is:

1. An aluminum electrode plate for an electrolytic capacitor obtained by etching an aluminum plate; wherein:
   a purity of the aluminum is 99.98 mass % or higher;
   at least one side comprises an etching layer at 70 μm or more from the surface in the depth direction; and
   when an image analyzing apparatus is used to measure a planar section of the etching layer in a position deeper than 20 μm from the surface, the number of pits in each measurement plane having a circle equivalent diameter of 0.01 to 1 μm is 70% or more of all of the pits within the corresponding measurement plane.

2. The aluminum electrode plate for an electrolytic capacitor of claim 1, wherein:
   a purity of the aluminum is 99.98 mass % or higher;
   Fe is contained in an amount of 5 to 50 ppm;
   Cu is contained in an amount of 5 to 40 ppm;
   the remainder comprises unavoidable impurities; and
   the quantity of Fe-containing intermetallic compounds having a spherical equivalent particle diameter of 0.1 to 1.0 μm is $1 \times 10^7$ to $10^{10}$/cm³.

* * * * *